US005316416A

United States Patent [19]

Kim

[11] Patent Number: 5,316,416

[45] Date of Patent: May 31, 1994

[54] DIAMOND CUTTING TOOL FOR HARD ARTICLES

[75] Inventor: Soo K. Kim, Seoul, Rep. of Korea

[73] Assignee: EHWA Diamond Ind. Co., Ltd., Kyongki-Do, Rep. of Korea

[21] Appl. No.: 953,509

[22] Filed: Sep. 29, 1992

[51] Int. Cl.[5] ........ B23B 27/20

[52] U.S. Cl. ........ 408/145; 408/204

[58] Field of Search ........ 408/145, 204, 703; 51/206 R

[56] References Cited

U.S. PATENT DOCUMENTS

D. 321,634 11/1991 Inoue ........ D8/70
2,268,663 1/1942 Kuzmick ........ 51/206
2,811,960 11/1957 Fessel ........ 125/15
3,016,661 1/1962 Nielsen ........ 51/206 R
3,127,887 4/1964 Metzger ........ 125/15
3,162,187 12/1964 Christensen ........ 125/15
3,338,230 8/1967 Lindblad ........ 125/15
3,353,526 11/1967 Daem et al. ........ 125/15
4,274,769 6/1981 Multakh ........ 408/145
4,461,268 7/1984 Inoue ........ 125/15
4,930,487 6/1990 Younger ........ 125/15
5,069,584 12/1991 Obermeier et al. ........ 408/145

*Primary Examiner*—Mark Rosenbaum
*Assistant Examiner*—John M. Husar
*Attorney, Agent, or Firm*—Vidas, Arrett & Steinkraus

[57] ABSTRACT

Diamond cutting tools such as a diamond core drill and a disk-shaped diamond saw which are used to grind and cut hard articles in order to bore or cut hard articles. The diamond cutting tools comprise a tool body and a diamond blade portion attached to an outer end of the tool body. The diamond blade portion has a plurality of outer cuts formed at an outer end thereof and a plurality of inner slots formed under and between the outer cuts and higher than the bottoms of outer cuts by a certain depth. The diamond cutting tools can carry out effectively boring or cutting work until the expensive diamond blade portion is completely worn away.

1 Claim, 3 Drawing Sheets

DIAMOND CUTTING TOOL FOR HARD ARTICLES

BACKGROUND OF THE INVENTION

1. Field of the Invention

The present invention relates to diamond cutting tools, and more particularly to diamond cutting tools such as a diamond core drill and a disk-shaped diamond saw which are used to grind and cut hard articles in order to bore concrete walls to repair concrete buildings etc., or cut hard articles such as testing samples and metallic workpiece, and which are improved in structures of diamond blade portions, which are made by pressing and heating metal and diamond powders, positioned at outer edge of the diamond cutting tools so as to improve machinability and lengthen working life of the cutting tools.

2. Description of the Prior Art

Referring to FIG. 1A, there is shown a known diamond core drill. The diamond core drill comprises a cup-shaped tool body 10A, an annular diamond blade portion 20A fixedly attached to the upper circumferential edge of the cup-shaped tool body 10A, and a shaft 11 formed the center of lower surface of the cup-shaped tool body 10A which is to be coupled to a power transmission shaft (not shown).

The annular diamond blade portion 20A is formed at an upper half part thereof with a plurality of cuts 21A which are circumferentially spaced from each other at certain intervals. Therefore, the cuts 21A formed at the diamond blade portion 20A cause chips from workpieces to be discharged therethrough and prevent slippage of the diamond blade portion 20A on workpieces, thereby improving machinability of the diamond core drill.

However, since the diamond core drill has the cuts 21A which are formed to only about middle depth of the annular diamond blade portion 20A in order to prevent failure thereof due to friction with workpieces of hard material, the diamond blade portion 20A has a flat cutting surface after the annular diamond blade portion 20A has worn away to a depth corresponding to the bottom of the cuts 21A. Therefore, machinability of the diamond core drill is remarkably decreased after the diamond blade portion 20A is worn away to the bottom of the cuts 21A, thereby causing working life thereof to be shortened.

On the other hand, referring to FIG. 1B, there is shown a known disk-shaped diamond saw. The disk-shaped diamond saw comprises a disk 10B and an annular diamond blade portion 20B attached to the outer circumferential edge of the disk 10B. As similar to the diamond core tool shown in FIG. 1A, the diamond saw is provided at the circumferential margin thereof with a plurality of radial slits 21B. The slits 21B are circumferentially spaced from each other at certain intervals each of which extends into the disk 10B from the periphery of the diamond blade portion 20B.

The diamond saw has somewhat machinability as result of being formed with the slits 21B. However, the slits 21B are not intended to improve machinability of the diamond saw but mainly intended to provide to the diamond saw with strength and elasticity to resist bending moment vertical to the surface of diamond saw during cutting work. In addition, the diamond saw is constructed such that the slits 21B are spaced from each other at large intervals so that the diamond blade portion 20B slips on workpieces during cutting work, thereby causing its machinability to be decreased.

SUMMARY OF THE INVENTION

The present invention has been made in view of the above described problems occurring in the prior art diamond cutting tools and an object of the invention is to provide a diamond cutting tool wherein the number or structure of cuts formed to its diamond blade portion is modified so that the diamond cutting tool can carry out effectively grinding or cutting work until the expensive diamond blade portion is completely worn away, thereby improving machinability and lengthening working life.

In accordance with an aspect of the present invention, the object mentioned above can be accomplished by providing a diamond cutting tool for hard articles including a cup-shaped tool body, a diamond blade portion attached to the open upper end of the cup-shaped tool body, and a plurality of upper cuts formed at the circumferential edge of the diamond blade portion and spaced from each other at certain intervals which open at the circumferential edge of the diamond blade portion and terminate at a certain depth of the diamond blade portion, said diamond cutting tool comprising: a plurality of lower slots formed at a lower part of the diamond blade portion and terminating at the open upper end of the cup-shaped tool body, each of the slots being positioned under and between the upper cuts and higher than the bottom of upper cuts by certain width.

In accordance with another aspect of the invention, the invention provides a diamond cutting tool for hard articles including a disk, a diamond blade portion attached to a circumferential edge of the disk, and a plurality of radial slits which open at a circumferential edge of the diamond blade portion and are extended into the disk at a certain depth, said diamond cutting tool comprising: a plurality of outer cuts formed at the circumferential edge of the diamond blade portion between the slits and spaced from each other at a certain intervals which open at the circumferential edge of the diamond blade portion and terminate at a certain depth of the diamond blade portion; and a plurality of inner slots formed at a lower part of the diamond blade portion and terminating at the circumferential edge of the disk, each of the slots being positioned under and between the upper cuts and higher than the bottom of upper cuts by certain width.

BRIEF DESCRIPTION OF THE DRAWINGS

These and other objects, features and advantages of the invention will become more apparent upon a reading of the following detailed specification and drawings, in which.

DETAILED DESCRIPTION OF THE PREFERRED EMBODIMENTS

A diamond cutting tools according to the present invention will now be described by referring to FIGS. 2A through 3B in the accompanying drawings.

Figure 1A:
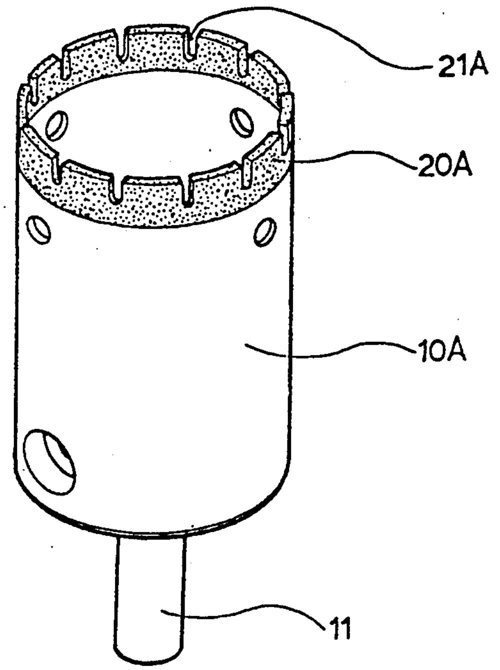
Fig.1 A PRIOR ART
FIG. 1A is a perspective view of a known diamond core drill.
Figure 2A:
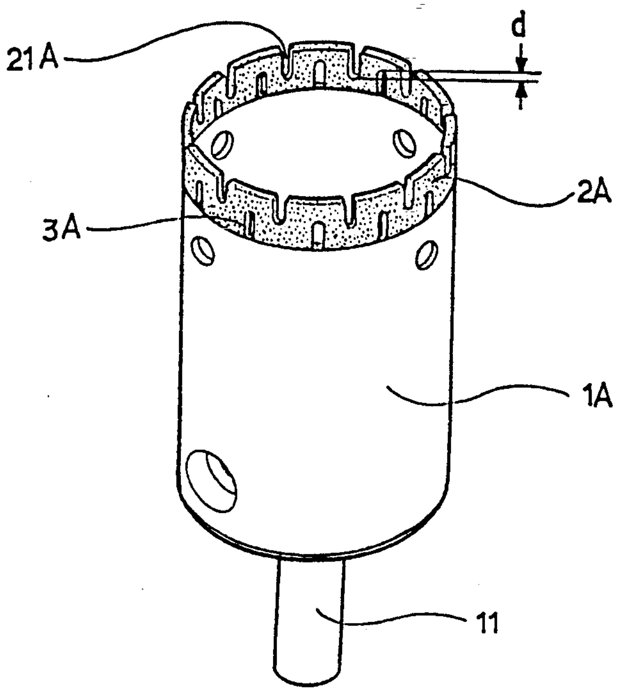
FIG. 2A is a perspective view of a diamond core drill according to the present invention.

Referring to FIG. 2A, there is shown a diamond core drill according to the invention. The diamond core drill comprises a cup-shaped tool body 1A, an annular diamond blade portion 2A fixedly attached to the upper circumferential edge of the cup-shaped tool body 1A, and a shaft 11 formed at the center of lower surface of the cup-shaped tool body 10A which is to be coupled to a power transmission shaft(not shown), as similar to the known diamond core drill shown in FIG. 1A.

The annular diamond blade portion 2A has a plurality of upper cuts 21A formed at circumferential edge thereof and spaced from each other at certain intervals and a plurality of lower slots 3A formed under the upper cuts 21A. Each of the upper cuts 21A opens at the circumferential edge of the diamond blade portion 2A and terminates at a middle position of depth of the diamond blade portion 2A. Each of the lower slots 3A is positioned under and between the upper cuts 21A and terminates at an upper end of the cup-shaped tool body 1A in such a manner that the top of the lower slot 3A is slightly higher than the bottom of the upper cuts 21A by a certain width "d".

Figure 1B:
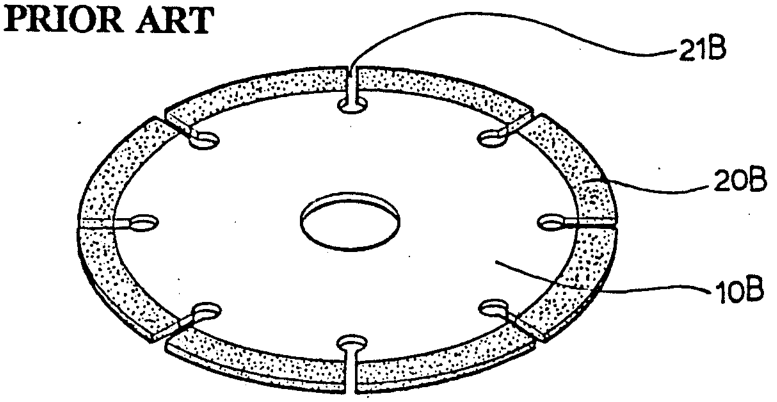
Fig. 1B PRIOR ART
FIG. 1B is a perspective view of a known disk-shaped diamond saw.
Figure 2B:
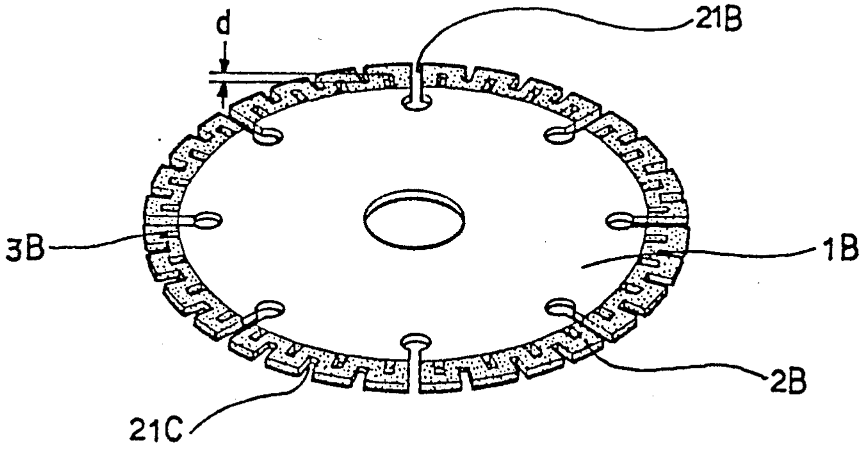
FIG. 2B is a perspective view of a disk-shaped diamond saw according to the present invention.

On the other hand, Referring to FIG. 2B, there is shown a disk-shaped diamond saw according to the invention. The disk-shaped diamond saw also comprises a disk 1B and an annular diamond blade portion 2B attached to the circumferential edge of the disk 1B. The diamond saw is also provided at the circumferential margin thereof with a plurality of radial slits 21B, as similar to the known diamond saw shown in FIG. 1B.

The annular diamond blade portion 2B has a plurality of outer cuts 21C spaced from each other at certain intervals between the slits 21B and a plurality of inner slots 3B formed under the outer cuts 21C. Each of the outer cuts 21C opens at the circumferential edge of the diamond blade portion 2B and terminates at a middle position of depth of the diamond blade portion 2B. Each of the inner slots 3B is positioned under and between the outer cuts 21C and opens at a circumferential edge of the disk 1B in such a manner that the top of the lower slot 3A is slightly higher than the bottom of the outer cuts 21C by a certain width "d".

Figure 3A:
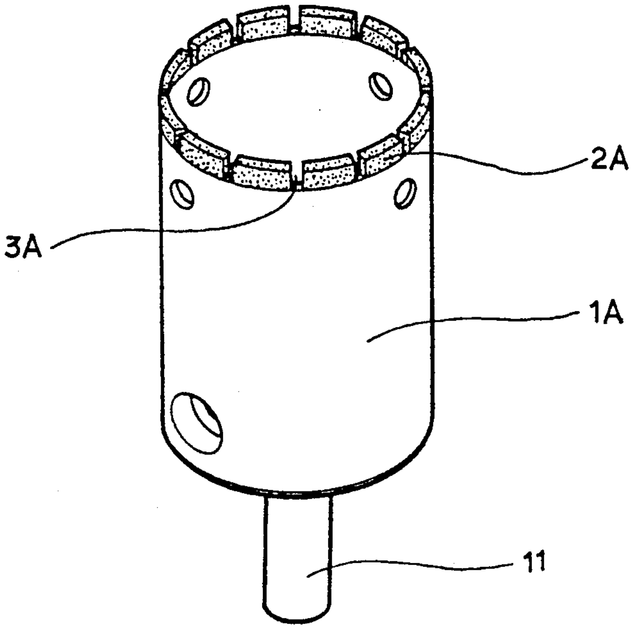
FIG. 3A is a perspective view of the diamond core drill shown in FIG. 2A wherein a diamond blade portion thereof has been worn away such that an upper cuts are vanished.

Operation of the diamond cutting tools mentioned above according to the present invention will be described hereinafter with reference to FIGS. 3A and 3B.

First, in case of the diamond core drill shown in FIG. 2A, the diamond core drill initially grinds hard articles such as concrete walls with the upper end surface of diamond blade portion 2A at which the upper cuts 21A are formed. Therefore, the diamond core drill is effectively machinable the articles by the upper cuts 21A without slippage on the articles.

Upon grinding articles, the diamond blade portion 2A of the diamond core drill will be worn away. As shown in FIG. 3A, when the diamond blade portion 2A has been worn away to a depth corresponding to the bottom of upper cuts 21A, the lower slots 3A positioned under and between the upper cuts 21A open at upper end surface of the diamond blade portion 2A. Accordingly, the diamond core drill can grind continuously the articles with effective machinability similar to that of initial diamond blade portion until the diamond blade portion 2A is completely worn away.

Therefore, even if the diamond core drill has been worn away to a depth corresponding to the bottoms of upper cuts 21A, since the lower slots 3A newly opens, the diamond core drill can carry out continuously grinding work without lost of machinability and structure strength until the expensive diamond blade portion 2A is completely worn away.

In addition, upon grinding, high temperature heat occurs from grinding region of the diamond blade 2A and articles by friction. At this time, since the high temperature heat is emitted from the upper cuts 21A and lower slots 3A, the diamond blade portion 2A is not deteriorated by the high temperature heat, thereby preventing machinability of the diamond core drill to be decreased. Furthermore, chips generated from the articles during grinding are effectively discharged through the upper cuts 21A and lower slots 3A.

On the other hand, since the disk-shaped diamond saw shown in FIG. 2B has a number of the outer cuts 21C including the slits 21B as compared with a known diamond saw shown in FIG. 1B, the diamond blade portion 2B causes friction with workpieces to increase in proportion to the increased number of outer cuts 21C, thereby improving machinability thereof.

Figure 3B:
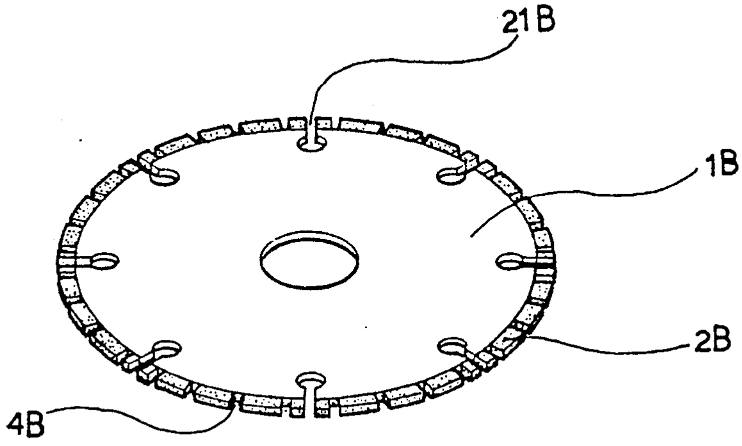
FIG. 3B is a perspective view of the disk-shaped diamond saw shown in FIG. 2B wherein a diamond blade portion thereof has been worn away such that an upper cuts are vanished.

Also, as shown in FIG. 3B, when the diamond blade portion 2B has been worn away to depth corresponding to the bottoms of outer cuts 21C, the inner slots 3B formed under and between the outer cuts 21C open newly at the circumferential edge of the diamond blade portion 2B. Therefore, as similar to the diamond core drill shown in FIG. 3A, even if the diamond saw has been worn away to a depth corresponding to the bottoms of outer cuts 21C, since the inner slots 3B newly opens, the diamond saw can carry out continuously cutting work without lost of machinability and structure strength until the diamond blade portion 2B is completely worn away. Furthermore, with the outer cuts 21C and inner slots 3B, high temperature heat occurring from cutting region during cutting work is emitted from the outer cuts 21C and the inner slots 3B and chips generated from workpieces are effectively discharged through the slots 3B and cuts 21C.

As apparent from the above description, the diamond cutting tools according to the present invention can carry out effectively machining work until the diamond blade portion is completely worn away and also causes heat by friction and chips generated from articles to be easily emitted and discharged, thereby improving machinability thereof and lengthening working life thereof.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A diamond cutting tool for hard articles comprising:

(a) a cup-shaped tool body having an open upper end; and (b) an annular diamond blade portion comprising:

(i) an upper circumferential edge and a lower circumferential edge, said diamond blade portion being attached at the lower circumferential edge to the open upper end of the cup-shaped tool body;

(ii) a plurality of upper cuts formed at the upper circumferential edge of the diamond blade portion, the upper cuts being spaced from each other at certain intervals, said upper cuts extending downward from the upper circumferential edge of the diamond blade portion and terminating at a depth of the diamond blade portion above the lower circumferential edge; and (iii) a plurality of lower slots formed at the lower circumferential edge, said lower slots extending upward from the lower circumferential edge of the diamond blade portion and terminating at a height below the upper circumferential edge, each of the lower slots being positioned under and between the upper cuts and extending higher than the bottom of the upper cuts by a predetermined distance.

* * * * *